United States Patent [19]

Joswig et al.

[11] Patent Number: 4,769,444

[45] Date of Patent: Sep. 6, 1988

[54] FLAMEPROOF POLYAMIDES

[75] Inventors: Thomas Joswig; Karsten Idel, both of Krefeld; Friedemann Müller, Neuss; Heinz-Josef Füllmann, Leichlingen, all of Fed. Rep. of Germany

[73] Assignee: Bayer Aktiengesellschaft, Leverkusen, Fed. Rep. of Germany

[21] Appl. No.: 50,232

[22] Filed: May 15, 1987

[30] Foreign Application Priority Data

May 27, 1986 [DE] Fed. Rep. of Germany ....... 3617731

[51] Int. Cl.[4] .................... C08K 5/34

[52] U.S. Cl. .................... 524/89; 524/94

[58] Field of Search .................... 524/89, 94

[56] References Cited

U.S. PATENT DOCUMENTS

| | | | |
|---|---|---|---|
| 3,873,567 | 3/1975 | Cyba | 524/89 |
| 3,987,056 | 10/1976 | Cobb | 548/476 |

OTHER PUBLICATIONS

B. J. Troitsch, "Brandverhalten von Kunstoffen, Carl-Hanswer-Verlag", Munich, West Germany (1982), pp. 48, 49, 58–60 and 65.

*Primary Examiner*—John Kight
*Assistant Examiner*—Kriellion Morgan
*Attorney, Agent, or Firm*—Connolly and Hutz

[57] ABSTRACT

Flameproof thermoplastic polyamide moulding materials which contain 2 to 20% by weight, based on the polyamide, of at least one non-halogenated cyclic aromatic inside compound.

8 Claims, No Drawings

FLAMEPROOF POLYAMIDES

The inventon relates to flameproof polyamide moulding materials which have been flameproofed by addition of non-halogenated cyclic imide compounds.

There are various possibilities of flameproofing polyamides, thus, for example, by addition of red phosphorus, especially to glass fibre-reinforced polyamides, by addition of a combination of inorganic metal compounds, such as, for example, ZnO, and organic halogen compounds, such as, for example, halogenated Diels-Alder adducts, or by addition of melamine or melamine derivatives.

Flameproofed halogen-free polyamide moulding materials which also allow a light colour to be established are gaining increasing importance, especially in the electrical field.

Only flameproofing with melamine or melamine derivatives is therefore possible for this field. The migration of the flameproofing agent, which occurs to an increased degree in an atmosphere with a high humidity content, has an adverse effect in the case of these flameproofed polyamides. This can lead to smudging of the contact points in the case of injection-moulded electrical components. Moreover, no improvement in the oxygen index is effected with this flameproofing of polyamides.

It has now been found, surprisingly, that polyamide moulding materials which are flameproofed with non-halogenated cyclic aromatic imide compounds do not have these disadvantages.

The invention therefore relates to flameproof thermoplastic polyamide moulding materials which contain 2–20% by weight, preferably 3–14% by weight, based on the polyamide, of at least one non-halogenated cyclic aromatic imide compound.

The imide compounds are preferably monomolecular and correspond to a compound of the general formula I-III:

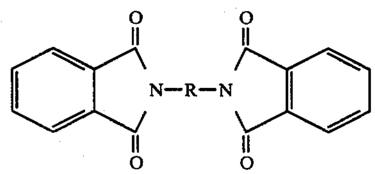

(I)

wherein R represents a single bond, a $C_1$–$C_{12}$-, preferably a $C_2$–$C_6$-alkylene, a $C_6$–$C_{14}$-, preferably a $C_6$-C12-mono- or bis-arylene or a $C_7$–$C_{24}$-,preferably a $C_8$–$C_{15}$-alkylarylene radical, or a radical

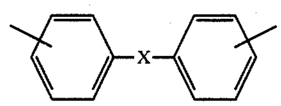

where X=S, O, SO, $SO_2$, CO or $CH_2$ and in the general formulae II and III

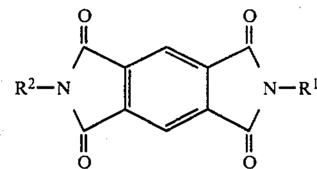

(II)

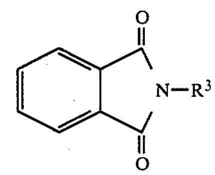

(III)

$R^1$, $R^2$ and $R^3$ are identical or different and represents a $C_1$–$C_{12}$-,preferably a $C_2$–$C_7$-alkyl, a $C_6$–$C_{14}$-, preferably a $C_6$–$C_{12}$-aryl, or a $C_7$–$C_{14}$-, preferably a $C_7$–$C_{10}$-alkylaryl radical, it being possible for the radicals $R_1$–$R_3$ optionally also to be substituted by OH groups.

The mono- or bisphthalimides or pyromellitic bisimides of methyl, benzylamine, aniline, 2-aminoethanol, phenylenediamine, ethylenediamine, 4,4'-diaminodiphenylmethane, m-xylylenediamine, p-xylylenediamine or 4,6-dimethyl-m-xylylenediamine are preferably employed.

Polyamides which are prepared by known polycondensation processes starting from diamines and dicarboxylic acids and/or lactams with at least 5 ring members or corresponding ω-amino acids are used for the preparation of the moulding materials according to the invention. Possible starting substances are aliphatic and aromatic dicarboxylic acids, such as adipic acid, 2,2,4- and 2,4,4-trimethyladipic acid, azelaic acid, sebacic acid, decanedicarboxylic acid, dodecanedicarboxylic acid, isophthalic acid and terephthalic acid, aliphatic and aromatic diamines, such as hexamethylenediamine, 2,2,4- and 2,4,4-trimethylhexamethylenediamine, the isomeric diamino-dicyclohexyl-methanes and diamino-dicyclohexyl-propanes, isophoronediamine, the isomeric xylylenediamines and bisaminomethyl-cyclohexane, aminocarboxylic acids, such as ε-aminocaproic acid, ω-aminoundecanoic acid and ω-aminolauric acid, and the corresponding lactams. Copolyamides of several of the monomers mentioned can also be employed.

Preferred polyamides are polyamide 6 and polyamide 6,6.

The polyamide moulding materials according to the invention are preferably prepared by mixing the imides with the polyamide in single- or twin-screw extruders of conventional design at the customary temperatures. For this, the components can be mixed before the extrusion or metered into the already molten polyamide, or polyamides can be introduced into the polyamide melt as a concen- trate.

The polyamides which have been rendered firerepellant can contain the customary additives and auxiliaries, for example one or more fillers or reinforcing substances, in particular glass fibres in amounts of 10–60% by weight, based on the total mixture. Other possible fillers and reinforcing substances are glass microbeads, carbon fibres, chalk, quartz, such as, for example, novaculite, and silicates, such as asbestos, felspar, mica, talc and wollastonite, as well as kaolin in calcined and non-calcined form. Dyestuffs and pigments, in particular carbon black colorants and/or nigrosin bases, stabilizers, processing auxiliaries and dust-binding agents may also be mentioned, as well as impact strength modifiers, for example copolymers of ethylene, poly(meth)acrylates or grafted polybutadienes.

The thermoplastic moulding materials according to the invention are processed by injection moulding or extrusion by the known methods. The flameproofed shaped polyamide articles are particularly suitable for use in the electrical and automotive fields and are employed, for example, for the production of housings and covers for technical equipment, such as domestic electrical appliances, and for automobile components.

EXAMPLES 1-16

Polyamide 66 (relative viscosity 3.0, measured on a one per cent strength solution in m-cresol at 25° C.) is mixed with various (bis)imides (prepared according to DEOS (German Published Specification) No. 3,342,414) in a twinscrew extruder type ZSK 32 from Werner and Pfleiderer at a meltmaterial temperature of 274°-280° C. and a throughput of 10 kg/hour. The mixture is cooled as a bristle in a waterbath. After granulation and drying, the mixture is processed to test pieces.

The composition of the mixture and the test results can be seen from Table 1 and 2.

In the Underwriters Laboratories Subj. 94 flameproof test, the polyamides containing the bisimides (Example 1 to 6) achieve the maximum grading with the classification VO at very thin wall thicknesses of 3.2 and 1.6 mm and thus exhibit an excellent flameproofing effect.

The oxygen index (OI) (according to ANSI/ASTM D 2863-77; sample ignition with a foreign flame from underneath) was furthermore determined as a measure of the fireproof effect.

COMPARISON EXAMPLE I-III

Polyamide 6,6 was tested without and with melamine or dechlorane as a flameproofing agent, as described in Examples 1-6.

The results are also given in Table 1.

TABLE 1

| Examples | | 1 | 2 | 3 | 4 | 5 | 6 | I | II | III |
|---|---|---|---|---|---|---|---|---|---|---|
| PA 66 | % by weight | 90 | 90 | 90 | 90 | 90 | 90 | 90 | 100 | 85 |
| Melamine | " | — | — | — | — | — | — | 10 | — | — |
| Dechlorane | " | — | — | — | — | — | — | — | — | 5 |
| Bisphthalimide from p-phenylenediamine | " | 10 | — | — | — | — | — | — | — | 10 |
| Ethylenediamine | " | — | 10 | — | — | — | — | — | — | — |
| 4,4'-Diaminodiphenylmethane | " | — | — | 10 | — | — | — | — | — | — |
| m-Xylylenediamine | " | — | — | — | 10 | — | — | — | — | — |
| p-Xylylenediamine | | | | | | 10 | | | | |
| 4,6-Dimethyl-m-xylylenediamine | " | — | — | — | — | — | 10 | — | — | — |
| Oxygen index | ($O_2$ %) | 30 | 25 | 29 | 27 | 26 | 27 | 20 | 18 | 21 |
| Migration[1] | (hours) | 20 | 24 | 22 | 28 | 20 | 26 | 6 | no[2] | 18 |
| Burning properties according to UL Subj. 94 1.6 mm | | VO | VO | VO | VO | VO | VO | V2 | V2 | V2 |
| 3.2 mm | | VO | VO | VO | VO | VO | VO | VO | V2 | V2 |

[1]Normal climate: 95% atmospheric humidity; 40° C.
[2]not observed

TABLE 2

| Example | | 7 | 8 | 9 | 10 | 11 | 12 | 13 | 14 | 15 | 16 |
|---|---|---|---|---|---|---|---|---|---|---|---|
| PA 66 | % by weight | 95 | 95 | 95 | 90 | 95 | 90 | 95 | 90 | 95 | 90 |
| Bisphthalimide of 4,4'-diaminodiphenylmethane | % by weight | 5 | — | — | — | — | — | — | — | — | — |
| m-Xylylenediamine | % by weight | — | 5 | — | — | — | — | — | — | — | — |
| Monophthalimide of benzylamine | % by weight | — | — | 5 | 10 | — | — | — | — | — | — |
| 2-Aminoethanol | % by weight | — | — | — | — | 5 | 10 | — | — | — | — |
| Pyromellitic acid bisimides of benzylamine | % by weight | — | — | — | — | — | — | 5 | 10 | — | — |
| 2-Aminoethanol | % by weight | — | — | — | — | — | — | — | — | 5 | 10 |
| Oxygen index | ($O_2$ %) | 26.5 | 25.5 | 26 | 28 | 23 | 29.5 | 29 | 30 | 25 | 31 |
| Migration[1] | (hours) | 20 | 20 | 24 | 22 | 30 | 32 | 26 | 24 | 30 | 34 |
| Burning properties according to UL Subj. 94 1.6 mm | | V2 | V2 | VO | VO | V2 | VO | VO | VO | V2 | VO |
| 3.2 mm | | V2 | VO | VO | VO | VO | VO | VO | VO | VO | VO |

We claim:

1. Flameproof thermoplastic polyamide moulding materials comprising 2 to 20% by weight, based on the polyamide, of at least one non-halogenated cyclic aromatic imide compound.

2. Moulding materials according to claim 1, characterized in that they comprise as the imide compound a compound of the general formula I-III:

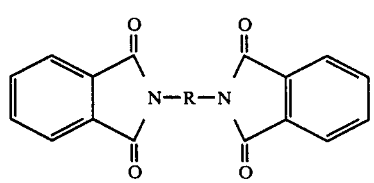

(I)

in which R represents a single bond, a $C_1$–$C_{12}$-, preferably a $C_2$–$C_6$-alkylene, a $C_6$–$C_{14}$-, preferably a $C_6$–$C_{12}$-mono or bis-arylene, or a $C_7$–$C_{24}$-, preferably a $C_8$–$C_{16}$-alkylarylene radical, or a radical of the formula

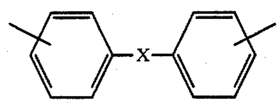

in which X denotes S, O SO, $SO_2$, CO or $CH_2$,

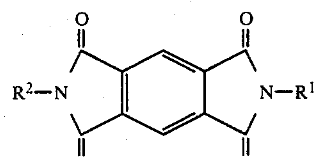

(II)

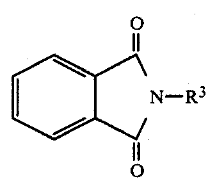

(III)

in which $R^1$, $R^2$ and $R^3$ are identical or different and represents a $C_1$–$C_{12}$-, preferably a $C_2$–$C_7$-alkyl, a $C_6$–$C_{14}$-,preferably a $C_6$–$C_{12}$-aryl, or a $C_7$–$C_{14}$-, preferably a $C_7$–$C_{10}$-alkylaryl radical, it being possible for the radicals $R^1$–$R^3$ optionally also to be substituted by OH groups.

3. Moulding materials according to claim 1 characterized in that a bisimide of 2 mol of phthalic anhydride and 1 mol of phenylenediamine, ethylenediamine, 4,4'-diaminodiphenylmethane, m-xylylenediamine, p-xylylenediamine or 4,6-dimethyl-m-xylylenediamine or 1 mol of pyromellitic dianhydride or phthalic anhydride and 2 or 1 mol of methylamine, benzylamine, aniline or 2-aminoethanol is used as the imide.

4. Moulding materials according to claim 1 characterized in that polyamide 6 or 66 is employed as the polyamide.

5. Moulding materials according to claim 2 wherein a bisimide of 2 mole of phthalic anhydride and 1 mol of phenylenediamine, ethylenediamine, 4,4'-diaminodiphenylmethane, m-xylylenediamine, p-xylenediamine or 4,6-dimethyl-m-xylylenediamine or 1 mole of pyromellitic dianhydride or phthalic anhydride and 2 or 1 mol of methylamine, benzylamine, aniline or 2-aminoethanol is the imide.

6. Moulding materials according to claim 2 whereih polyamide 6 or 66 is polyamide.

7. Moulding materials according to claim 3 wherein polyamide 6 or 66 is the polyamide.

8. Moulding materials according to claim 5 wherein polyamide 6 or 66 is the polyamide.

* * * * *